Patented Jan. 10, 1933

1,893,770

UNITED STATES PATENT OFFICE

ERNST AUGUST GARBE, OF BERLIN-LICHTERFELDE, GERMANY

DISINFECTING MEDIUM AND THE PROCESS OF MANUFACTURING THE SAME

No Drawing. Application filed July 2, 1927, Serial No. 203,269, and in Germany July 7, 1926.

My invention relates to improvements in disinfecting media and the process of manufacturing the same, and more particularly in disinfecting media such as are used for disinfecting stables, cattle yards, agriculture appliances, and the like for preventing spreading of contagious diseases such as anthrax, glanders, whitlow, black leg (athæ etizooticæ), and the like, and killing the carrier of the disease. The object of the improvements is to provide a disinfecting medium of the class referred to by means of which complete disinfection is insured by atomization or vaporization within the closed stables, and which does not injuriously affect the animals living within the stables and simultaneously has a disinfecting action on the hair, the claws and other parts of the body of the animal. In the practical use of the disinfecting medium I have found that after complete disinfection of the stable the animals felt very comfortable, and that they had an increased desire for food. Further, I have found that the disease of the animals has been directly diminished.

In order that my invention be clearly understood I shall now describe an example of my improved disinfecting medium and the process of manufacturing the same.

At first I make an extract from tobacco containing from 3½ to 4% of nicotine, for which purpose a suitable amount of tobacco, for example 1 pound of non-sauced tobacco, is soaked in 4 liters of water and boiled a suitable length of time, say 2 hours. Preferably 1 part of kitchen salt is added to 8 parts of water, in which case a more fluent extract is obtained, probably, because glutinous and albuminous matter is coagulated by the salt and does not enter into solution. Further, I have found that an addition of powderous sulfur increases the efficiency of the extract. After boiling the liquid is pressed from the tobacco, and the extract is obtained by filtration, which extract is allowed to stand from 8 to 14 days. In my opinion a certain fermentation is now produced in the extract, which is shown by the development of gas bubbles. The said extract is now mixed with glacial acetic acid and "Lysol", a soap solution of cresol at the rate of 2 parts of tobacco extract, 4 parts of glacial acetic acid and 4 parts of "Lysol". At first, the mixture is a milky liquid, which however is made clear and homogeneous by standing from 1 to 2 hours. Small traces of solid matter may be removed by filtration. I have found that by thus allowing the mixture to stand the character and the efficiency thereof is changed to a certain extent, though I am not able to explain the character of the said change.

For using the said disinfecting medium I dilute 1 part thereof in 5 or 7 parts of water, and preferably for avoiding precipitation of lime I make use of soft water such as rain water. Preferably the liquid is slightly heated before being atomized, because in a warm state it is in the form of a clear opalescent dispersion, while in a cold state it is milky. By means of a suitable atomizing apparatus the liquid is spread on the walls and the floor of the stable and the agriculture appliances to be disinfected. An increased efficiency is obtained by simultaneously vaporizing sulfurous acid within the stable, which may be taken from bottles or produced by combustion of sulfur. The mixture of gases thus produced completely kills the carriers of the disease, and it has no injurious effect on the sick animals breathing the same. On the contrary, I have found that by breathing the gases the bacteria found on the mucous membranes are killed. In some cases I add etherial oils such as oil of turpentine in watery dispersion to the mixture.

I claim:

1. A process for manufacturing a means for combating contagious and infectious diseases, more especially for disinfecting stables and the like of hoof and mouth diseases, anthrax, glanders and the like, which comprises mixing of tobacco extract with glacial acetic acid and cresol soap solution, allowing the mixture to stand until a homogeneous dispersion results and diluting before use with a quantity of soft water several times the volume of the mixture.

2. A disinfecting medium in the form of a clear, homogeneous dispersion which is stable against dilution which comprises a mixture of cresol soap solution, glacial acetic acid, and tobacco extract.

3. A disinfecting medium in the form of a clear, homogeneous dispersion which is stable against dilution comprising about two parts of tobacco extract, four parts glacial acetic acid and four parts of saponified cresol.

In testimony whereof I hereunto affix my signature.

ERNST AUGUST GARBE.